July 5, 1966     J. E. SKUDERNA     3,259,762
ELECTROSTATIC INDUCTION POWER SUPPLY
Filed April 16, 1963     2 Sheets-Sheet 2
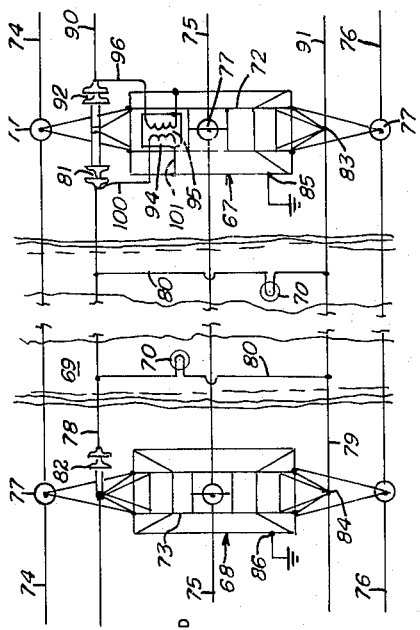
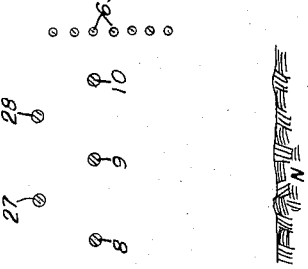
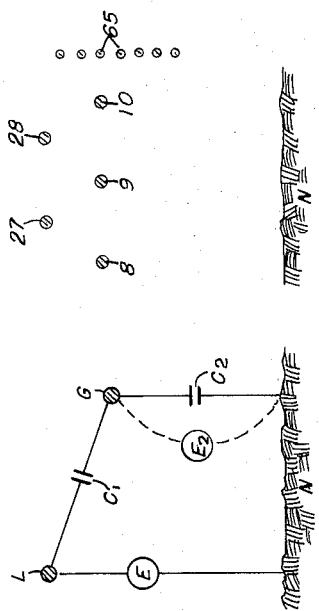
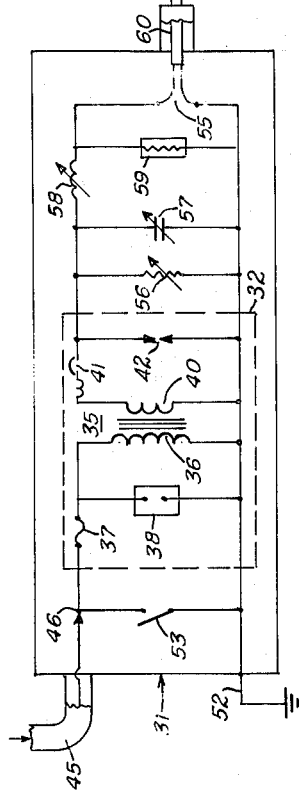
INVENTOR
JOHN E. SKUDERNA
BY *Ernest S Cohen*
*Gersten Sadowsky*
ATTORNEYS

United States Patent Office 3,259,762
Patented July 5, 1966

3,259,762
ELECTROSTATIC INDUCTION POWER SUPPLY
John E. Skuderna, Denver, Colo., assignor to the United States of America as represented by the Secretary of the Interior
Filed Apr. 16, 1963, Ser. No. 273,535
2 Claims. (Cl. 307—109)

The invention herein described and claimed may be manufactured and used by or for the Government of the United States of America for governmental purposes without the payment of royalties thereon or therefor.

This invention relates to improved devices for supplying low voltage power to auxiliary equipment associated with high voltage power transmission lines. The invention makes conveniently available low-cost power supplied at suitable voltages, for use in low power auxiliary electrical devices such as aircraft warning lights, microwave relay apparatus, and other forms of powered communication equipment which may be located in the isolated areas where high voltage transmission lines are generally found. For this purpose, advantageous utilization is made of the energy developed in the overhead ground wires normally provided to protect transmission lines from lightning, as a result of such wires being present in the electrostatic field established by the voltage difference between the transmission line conductors and ground.

Power for transmission lines auxiliary equipment has been previously supplied in various ways which have serious drawbacks. The use of a distribution line constructed to join auxiliary loads to an external or separate power distributing system becomes excessively expensive, especially in remote areas. Merely tapping high voltage transmission lines at 230 kilovolts and above, with a potential transformer, requires the use of prohibitively expensive potential transformers and associated lightning arresters. Standard coupling capacitor potential devices have also been used to tap the transmission line but have been found uneconomical for producing sufficient power for the normal needs of auxiliary equipment. Resistor-loaded distribution transformers connected to a length of an insulated overhead ground wire become dangerous upon loss of load, and require extreme safety precautions to prevent danger to life from excessive over-voltages. The objectionable features of these and other like expediencies used for supplying power to auxiliary transmission line equipment, are effectively overcome by means of the unique arrangements constituting the present invention.

To obtain a most effective application of the energy supplied from the transmission lines' overhead ground wires, the invention includes a special loading circuit in which this energy is received and transformed to an output which is best suited for use in the auxiliary equipment. According to a further form of the invention, connections are made from the loading circuit back to a span of overhead ground wires crossing a river or canyon, whereby a particularly difficult aircraft warning light problem is solved in an economical and efficient manner.

An object of the present invention is therefore to provide in operative association with the conductors of high-voltage transmission lines, electrical circuitry supplying low-voltage energy for auxiilary devices made operative in conjunction with the transmission of power.

Another object of the present invention is to provide an arrangement of electrical apparatus, comprising the overhead ground wires of high voltage transmission lines, for producing low-voltage power.

A still further object of the present invention is to provide in a power distributing arrangement, an adjustable load circuit controlling the characteristics of the power distributed.

These and other objects and advantages of the invention will be more readily understood from the following detailed description of the preferred embodiments of the invention, considered together with the accompanying drawings wherein:

FIG. 2 is a schematic of a circuit in which the power taken from the high-voltage transmission lines is suitably transformed for use in the load of low-voltage auxiliary appliances;

FIG. 3a illustrates by diagrammatic equivalent circuits, the voltage and capacitance relationship between the several high-voltage conductors and ground wires involved in a capacitance coupling according to the invention;

FIG. 3b is a showing of the relative physical relationship between conductors and wires of arrangements in accordance with different embodiments of the invention;

FIG. 4 is a schematic illustration of a further embodiment of the invention; and FIG. 5 is a schematic of a circuit in the nature of that shown in FIG. 2, having particular utility in connection with the embodiment of FIG. 4.

Figure 1:
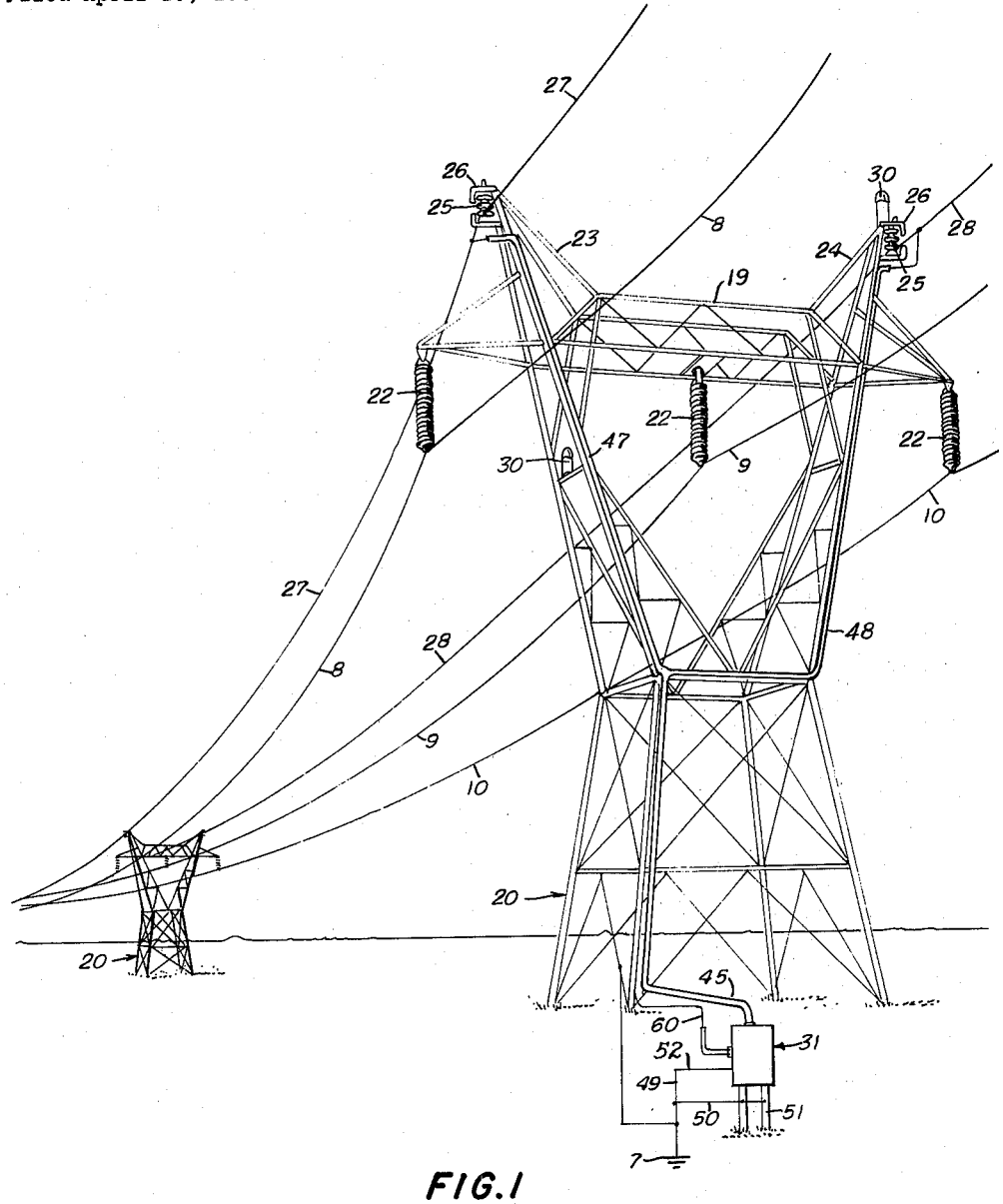
FIG. 1 is a partly schematic illustration showing a section of a high-voltage transmission system embodying the present invention.

The alternating current high voltage conductors with which the present invention is operatively effective, may be arranged in various ways upon the supporting towers of a power transmission system. Detailed discussions of the electrical characteristics of several such arrangements may be found in chapter 3 of the text Electric Power Transmission by Zaborszky and Rittenhouse, published by the Ronald Press Company, New York, in 1954. In the particular form of transmission line structure illustrated in FIG. 1 of the instant disclosure, the three phase high voltage conductors 8, 9 and 10 are uniformly spaced horizontally beneath the cross-arm supports 19 of towers 20. The individual conductors are suspended from each tower in a conventional manner, at the end of a string of insulators 22 connected to hangers fixed to the support 19. Suspended from the uppermost ends of the tower extensions 23 and 24, shown rising above support 19, are relatively shorter strings of insulators 25, protected by horn gaps 26, and from the ends of which are supported overhead ground wires 27 and 28. In contrast to the usual tower installations wherein the ground wires are connected to ground through their attachment to the grounded structure of the tower, the ground wires 27 and 28 are isolated from ground by the insulator strings 25. As best shown in the diagram of FIG. 3b, the wires 27 and 28 are spaced above and between the high voltage phase conductors 8 to 10. Overhead ground wires are arranged thusly to intercept lightning strokes and prevent them from striking the conductors in the spans between the supporting towers. The grounded tower structures are generally effective to intercept strokes to keep them off those portions of the conductors adjacent to the towers.

The basic configuration of the spacing between the conductors and ground wires in the present invention varies only slightly from that of a conventional transmission system, since the ground wires of the invention must afford suitable lightning protection as well as provide for an electrostatic coupling between the ground wires and conductors from which is derived the power supplied for energizing the auxiliary devices. Referring particularly to the showing of FIG. 3a, the cross-sectioned conductors L and G are arranged to represent the structural equivalent of the high voltage conductors 8, 9 and 10, and the isolated ground wires 27 and 28, respectively. Assumption is made that as a result of a high voltage E, equivalent to the line L to ground N voltage impressed on the conductors 8 to 10, an electrostatic field surrounding line L is established by the voltage difference between the conductors and ground, which is independent of current in the conductors. Because isolated line G is in this electrostatic field, a voltage difference is also established between line G and ground N. This phenomenon is further depicted in FIG. 3a, by the equivalent circuits comprising capacitances $C_1$ and $C_2$ which represent the respective electrostatic couplings between the transmission line conductor L and the isolated pick-up wire G, and the wire G to ground N. As indicated previously, the voltage induced on the isolated wire G is dependent upon the spacing of the wire relative to the energized conductor and ground, wherefore its numerical value $E_2$ may be ascertained by reference to the relative magnitudes of the capacitances $C_1$ and $C_2$.

Power for the transmission line auxiliary devices exemplified by aircraft warning lights 30 on the tower 20 of FIG. 1, is received from isolated overhead ground wires through the intermediary of a tuned loading circuit housed in an enclosure or cabinet 31 situated near the base of the tower. Reference is made to FIG. 2 for a preferred form of this load circuit which is shown enclosed by a frame representing a housing therefor, namely the cabinet 31 of FIG. 1. The dashed line enclosure within this frame represents the outer casing or tank 32 of a conventional, self-protected type power distribution transformer 35, which is operatively effective to reduce the relatively high induced voltage supplied by the ground wire pickup, to the low voltage suitable for the lights 30. A circuit from a high voltage primary winding 36 of the transformer leads to a protective fuse link 37 in series therewith, which becomes effective to disconnect the transformer from the line in the event of an internal coil failure. Mounted integrally with transformer casing 32 is a lightning arrester 38 connected across the primary 36 and to ground, that operates to provide over-voltage protection. In series with the transformer secondary 40 is a circuit breaker 41, thermally controlled to provide appropriate overload and short-circuit protection. Also included is a low-voltage spark gap 42 which in cooperation with the arrester 38, protects against lightning surges and short circuits in the low voltage load circuit. Short circuits in this instant would result in excessive currents and voltages in the pickup circuit comprising the isolated wires 27 and 28.

Input to the load circuit is supplied through a high-voltage shielded cable 45 entering the cabinet 31 through a protective stress cone 46. Shield cable 45 extends from the cabinet to within the top of the tower 20, where it is joined to leads 47 and 48 coming from the terminals of that portion of the overhead ground wires 27 and 28 which are isolated from ground by insulators 25 for the purposes of the instant invention. Cabinet 31 is solidly grounded through an underground line from the base of tower 20, joined to a ground rod 49 which is in turn connected as shown in FIGS. 1 and 2, to lugs fastening a ground wire 50 to the metal legs 51 of the base for cabinet 31, and to a lead 52 providing a common ground to components of the loading circuit. A high-voltage switch 53 connected between the lead-in cable 45 and ground is provided to facilitate installation and periodic maintenance of the installation within cabinet 31 by its closure directing high voltage from the shielded cable directly to ground.

Low voltage output from the load circuit is derived across terminals 55, through a tuning circuit comprising an adjustable shunt resistance 56, and adjustable shunt capacitance 57, and an adjustable series inductance 58. Adjustments are made to the capacitance 57 until the desired output voltage is obtained across terminals 55. This capacitance in effect determines the net value of the capacitance represented by $C_2$ in FIG. 3a. The inductance 58 is adjusted to provide series resonance with the net capacitance of the supply circuit including the capacitance of capacitor 57, and the coupling capacitance between the pickup circuit and the transmission conductors designated as $C_1$ in FIG. 3a. In this manner the resonant circuit is effective to obtain optimum power transfer characteristic and provide essentially constant output voltage from no load to full load. With such series resonance the effective impedance of the voltage source becomes very small, whereby reduction of the voltage regulation to normally acceptable limits is made possible. Adjustable resistance 56 coperates with a dummy load 59 connected across the output leads, to effect a damping out of possible ferroresonant over-voltages resulting from the saturation of the iron core of the transformer 35, and series inductance 58. This tuned circuit allows a relatively stable voltage to be maintained across the output terminals even though the pickup circuit output across secondary 40 of the transformer 35, varies rather widely. A suitable armored cable 60 shown in FIG. 1 extending from the cabinet 31, constitutes a circuit lead on which the output of the load circuit is delivered to the warning lights 30 atop and on the sides of the tower.

In an exemplary installation according to the present invention as shown in FIGS. 1 and 2, the output from the load circuit at 120 volts, supplies 1460 watts to energize the warning lights 30, in addition to 450 watts for the dummy load 59. Approximately four miles of overhead ground wire on a three-phase transmission system energized at 230 kv., phase to phase, is isolated from its grounded support towers by suitable insulators in the manner described above. Accordingly, for a full load output from the lead circuit, the capacitance coupling on the isolated ground wire makes available approximately 12,000 volts for input to the primary 36 of the transformer 35. Suitable adjustable components for the load circuit producing the nearly 2000 watts required for the over-all load in this example, are a 50–500 ohms resistance 56, a 72–101 microfarads capacitor 57, and a 32–38 millihenries inductance 58. An increased output load can be supplied as required, by increasing the length of isolated overhead ground wire, whereby the current available at the output of the pickup circuit is proportionately increased. It is therefore evident that a selected number of spans between towers, of one or both of the ground wires 27 and 28, may be isolated as described, to form the particular pickup circuit necessary for any specified load.

As an alternative to using the overhead ground wires for supplying power to the pickup circuit, use can be made of an isolated pickup mesh of the type diagrammatically shown in FIG. 3b by the vertically aligned conductors 65. Capacitances of different magnitudes may be obtained as needed to supply loads of different magnitudes by simply varying the number of conductors 65 in the isolated mesh arrangement which is to be supported on the transmssion towers adjacent to the high-voltage transmission conductors 8, 9 and 10. However, for any specified high voltage on the transmission conductors, the rate of capacitance increase diminishes rapidly for increased numbers of wires 65 after a predetermined number of such wires are used.

The further modification of the invention shown in FIGS. 4 and 5, is particularly adapted to supply power to aircraft warning lights strung along the catenary defined by the overhead ground wires spanning the distance between supporting towers. Warning lights installed in this way are generally located at a number of equally spaced points along the catenary path extending between two adjacent towers. In the schematic showng of FIG. 4, a plurality of such warning lights 70 are supported between towers 67 and 68 in the catenary path of the ground wires following the three phase high voltage lines 74, 75 and 76. These lines are suspended from insulator strings 77 hung from tower cross-arm supports 72 and 73 in a conventional manner best illustrated in FIG. 1. As shown in FIG. 4 the lines span a river crossing 69 on whose banks the towers 67 and 68 are erected. Lights 70 are maintained at appropriate locations by means of their connections to the overhead ground wires 78 and 79, suspended between towers 67 and 68 to protect the high voltage lines as was previously explained. The connectors mooring the lights in place comprise conductors 80 which attach to the overhead ground wires 78 and 79, whereby they fashion parallel circuits for the lights between the ground wires. Strings of insulators 81 and 82 suspended from suitably high points on one side of the cross-arm supports on towers 67 and 68, support the ground wire 78 between the towers, and isolates this ground wire from the towers' ground. On the other hand, ground wires 79 is supported for suspension between the towers by electrically conductive connections 83 and 84 attaching to corresponding high points on the other side of the cross-arm supports on towers 67 and 68. Consequently, ground wire 79 is solidly grounded through its connections and the tower structures, the latter being in turn grounded at their bases 85 and 86 in the usual manner by means of ground rods or the like.

Stretching back from tower 67 to succeeding tower on the right side of river 69 as shown in FIG. 4, are further ground wires 90 and 91. An insulator string 92 attached to a suitable high point of the cross-arm support 72 on tower 67, provides support for the end of the ground wire 90, and isolates it from the tower ground. This ground wire is further isolated at its next and further distant support points by insulators on the succeeding towers not shown in the figure. Ground wire 91 is essentially an extension of ground wire 79 since it is also attached at the conductive connection 83 whereby it is solidly connected to ground through the tower structure. Located near the top of tower 67, on an appropriate support structure, is a grounded metal cabinet 94 in which are arranged the components of a load circuit 95 corresponding to that disclosed in FIG. 2. High voltage power induced by the capacitive coupling between an extended predetermined length of the ground wire 90, and the high voltage transmission lines 74, 75 and 76, is brought to the load circuit by a circuit completed from the isolated ground wires on lead 96. Further leads 100 and 101 from the output of the load circuit 95, are connected to the isolated ground wire 78, and ground respectively, whereby the several parallel circuits comprising the warning lights 70 in the connectors 80, are supplied with the energizing power.

An alternative and simplified form of the load circuit previously described, is shown in FIG. 5. The components of this circuit are enclosed in a suitable cabinet structure, indicated by the rectangle 103, particularly adapted for use near the top of the tower. Into cabinet 103 are brought connections from the overhead ground wires referred to in connection with the embodiment shown in FIG. 4, including the input and output overhead ground wires 90 and 78, respectively, and the grounded wires 91 and 79. The high voltage derived by capacitance coupling and supplied on isolated ground wire 90, is received across the impedance of a variable capacitance 105, and through a variable inductance 106 whose circuit to a ground lead 107 is completed through a variable resistance 108. This high voltage coming from wire 90 is consequently reduced by the potential drops across the aforesaid adjustable impedance circuits whereby a voltage output having a magnitude appropriate for the rating of the load lights 70, is made available across the light circuits arranged between the isolated ground wire 78, and grounded wire 79. A proper constant voltage for supplying the load is best arrived at by adjusting the inductance 106, and stability and adequate fine control of the output voltage is achieved by adjusting resistance 108. Moreover, the variable inductance 106 acts in conjunction with the variable capacitance 105, in a manner corresponding to that discussed previously in connection with the similar components of FIG. 2, to provide the tuned circuit control which produces a well-regulated output voltage for the load. By virtue of this tuning control the output voltage can be held practically constant for all contemplated loading conditions while input voltage may vary considerably between no load and full load conditions.

A lighting arrester 113, and a spark gap 109, are also provided in the circuit of FIG. 5, to act across the high voltage input and the low voltage output circuits, respectively, whereby they are effective as required to discharge high voltage surges to ground in the usual manner. A fuse 110 is connected in the output circuit to protect it from over-current conditions. As in the circuit of FIG. 2, the opposite ends of the instant load circuit are provided with high and low voltage grounding switches 111 and 112, to facilitate safe inspection and maintenance of the circuit.

Since a distribution transformer is not required in the circuit of FIG. 5, possible over-voltage conditions due to ferroresonant effects are avoided. The economy and simplicity of a design not using a transformer is readily apparent.

While preferred embodiments of the invention have been illustrated and described herein, it is to be understood that the invention is not limited thereby, but is susceptible to change in form and detail.

What is claimed is:

1. In combination with the high-voltage transmission conductors of an alternating current power system, which are suspended on insulator means attached to each one of a multiplicity of support means individually maintained and electrically grounded at spaced intervals, said insulator means electrically isolating said conductors from said electrical grounds, continuous lengths of electrically conductive wires suspended on said support means at said spaced intervals by further insulator means whereby said wires are isolated from said electrical grounds and extend adjacent to the path of the said first mentioned conductors, and substantially parallel thereto, a load circuit comprising two principal leads and a plurality of voltage modifying and regulating components connected in and between said leads, the respective terminal segments of said leads providing input and output connections for said load circuit, one of said input connections being electrically connected to a predetermined continuous portion of said isolated conductive wires, said plurality of components comprising a transformer supplying from its secondary a voltage output reduced from a voltage supplied at said one input connection to said load circuit, variable resistance and capacitance components having impressed across them the said reduced voltage output, and an adjustable inductance in a series connection with said resistance and capacitance components, said output connections being electrically connected to further circuit means operably responsive to an output from said load circuit to energize low voltage appliances, said further circuit means comprising an additional predetermined continuous portion of said isolated conductive wires, and electrically conductive elements connecting said low voltage appliances in parallel circuits between said conductive wires of said additional portion, another of said connections provided by said load circuit lead segments being electrically grounded to said electrical grounds, and means operatively responsive to a voltage surge above a predetermined voltage in a circuit between the said one input connection and the said another connection of the said load circuit, to complete a direct circuit from said portion of isolated conductive wires to said electrical grounds.

2. In combination with the high-voltage transmission conductors of an alternating current power system, which are suspended on insulator means attached to each one of a multiplicity of support means individually maintained and electrically grounded at spaced intervals, said insulator means electrically isolating said conductors from said electrical grounds, continuous lengths of electrically conductive wires suspended on said support means at said spaced intervals by further insulator means whereby said wires are isolated from said electrical grounds and extend adjacent to the path of the said first mentioned conductors, and substantially parallel thereto, so as to comprise a uniform mesh of vertically aligned substantially equally spaced electrical conductors arranged approximately at right angles to the alignment of said high-voltage conductors, a load circuit comprising two principal leads and a plurality of voltage modifying and regulating components connected in and between said leads, the respective terminal segments of said leads providing input and output connections for said load circuit, one of said input connections being electrically connected to a predetermined continuous portion of said isolated conductive wires, said plurality of components comprising a transformer supplying from its secondary a voltage output reduced from a voltage supplied at said one input connection to said load circuit, variable resistance and capacitance components having impressed across them the said reduced voltage output, and an adjustable inductance in a series connection with said resistance and capacitance components, said output connections being electrically connected to further circuit means operably responsive to an output from said load circuit to energize low voltage appliances, another of said connections provided by said load circuit lead segments being electrically grounded to said electrical grounds, and means operatively responsive to a voltage surge above a predetermined voltage in a circuit between the said one input connection and the said another connection of the said load circuit, to complete a direct circuit from said portion of isolated conductive wires to said electrical grounds.

References Cited by the Examiner
UNITED STATES PATENTS

| | | | |
|---|---|---|---|
| 1,870,851 | 7/1932 | Jones | 307—109 X |
| 1,967,652 | 7/1934 | Austin | 307—109 X |
| 2,005,147 | 6/1935 | Langruth | 307—109 X |
| 2,226,154 | 12/1940 | Bethenod | 340—38 |
| 2,249,877 | 7/1941 | Woods | 307—109 X |
| 2,822,481 | 2/1958 | Schiller | 307—109 |

ORIS L. RADER, *Primary Examiner.*

LLOYD McCOLLUM, *Examiner.*

L. R. CASSETT, T. J. MADDEN, *Assistant Examiners.*